United States Patent
Hung et al.

(10) Patent No.: US 12,513,116 B2
(45) Date of Patent: Dec. 30, 2025

(54) GOTO ACTION IN NETWORK TRAFFIC POLICIES

(71) Applicant: Arista Networks, Inc., Santa Clara, CA (US)

(72) Inventors: Denny Hung, Cupertino, CA (US); Peter Delevoryas, Santa Clara, CA (US); Ramakrishna Paduvalli, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 498 days.

(21) Appl. No.: 17/476,352

(22) Filed: Sep. 15, 2021

(65) Prior Publication Data

US 2023/0077594 A1 Mar. 16, 2023

(51) Int. Cl.
*H04L 9/40* (2022.01)
*H04L 47/20* (2022.01)
*H04L 47/2416* (2022.01)
*H04L 47/2441* (2022.01)

(52) U.S. Cl.
CPC .......... *H04L 63/0263* (2013.01); *H04L 47/20* (2013.01); *H04L 47/2416* (2013.01); *H04L 47/2441* (2013.01); *H04L 63/0236* (2013.01); *H04L 63/20* (2013.01)

(58) Field of Classification Search
CPC ..... H04L 47/00; H04L 63/0263; H04L 47/20; H04L 47/2416; H04L 47/2441; H04L 63/0236; H04L 63/20
See application file for complete search history.

(56) References Cited

U.S. PATENT DOCUMENTS

| | | | |
|---|---|---|---|
| 8,316,151 B1 | 11/2012 | Ammundi | |
| 8,407,779 B1* | 3/2013 | Shah | H04L 47/20 726/13 |
| 8,719,917 B1* | 5/2014 | Ammundi | H04L 63/0263 726/14 |
| 9,391,958 B2* | 7/2016 | Swaminathan | H04L 63/02 |
| 9,571,502 B2 | 2/2017 | Basso et al. | |
| 10,652,281 B1* | 5/2020 | Moolenaar | H04L 63/0236 |
| 2003/0120622 A1* | 6/2003 | Nurmela | H04L 63/0227 706/47 |
| 2006/0200622 A1* | 9/2006 | Ahuja | G11C 15/00 711/108 |
| 2008/0215518 A1* | 9/2008 | Matsuda | H04L 63/0263 706/47 |
| 2009/0052443 A1* | 2/2009 | Kolenchery | H04L 63/0263 370/389 |
| 2009/0199266 A1 | 8/2009 | Kling et al. | |

(Continued)

OTHER PUBLICATIONS

International Searching Authority, "International Search Report & Written Opinion", PCT/2023/061077, mailed Apr. 24, 2023, 13 pgs.

(Continued)

*Primary Examiner* — Derrick W Ferris
(74) *Attorney, Agent, or Firm* — Fountainhead Law Group, PC

(57) ABSTRACT

A traffic policy includes policy rules that specify branch actions in their action fields. A branch action specifies another policy rule in the traffic policy. Packet filters generated from the traffic policy represent the traffic policy rules and execution order semantics of the branch rules.

20 Claims, 14 Drawing Sheets

(56) References Cited

U.S. PATENT DOCUMENTS

| | | | |
|---|---|---|---|
| 2014/0282854 A1* | 9/2014 | Clark | H04L 63/20 |
| | | | 726/1 |
| 2017/0346765 A1 | 11/2017 | Immidi | |
| 2018/0083876 A1 | 3/2018 | Sharma et al. | |
| 2018/0167307 A1 | 6/2018 | Barry et al. | |
| 2021/0067448 A1 | 3/2021 | Remen et al. | |
| 2021/0226920 A1* | 7/2021 | Ahn | G06F 21/562 |
| 2021/0243158 A1* | 8/2021 | Fandli | H04L 63/0236 |
| 2021/0326175 A1 | 10/2021 | Herbert | |

OTHER PUBLICATIONS

Schlesinger et al., "Concurrent NetCore: From Polices to Pipelines", Proceedings of the 2009 ACM Sigplan Conference on Programming Language Design and Implementation, Jun. 15-20, 2009, vol. 49, No. 9, Aug. 19, 2014, pp. 11-24.

Smolka et al., "A fast compiler for NetKAT", 11, ACM Sigplan Notices, Association for Computing Machinery, vol. 50, No. 9, Aug. 29, 2015, pp. 328-341.

* cited by examiner traffic policy, 600

```
traffic-policy example-policy
 match A ipv4
  source prefix 1.1.1.1/32
  actions
   count acc-A
   goto C
 match B ipv4
  protocol tcp source port 1
  actions
   count acc-B
   goto D
 match C ipv4
  protocol tcp destination port 2
  actions
   count acc-C
 match D ipv4
  destination prefix 2.2.2.2/32
  actions
   count acc-D
```

```
def GotoActionResolver( ruleList ):

// Assume that the last rule is always a match-all while ruleList has a rule with GOTO action:

Let R_c be the lowest priority rule with GOTO action
      Let i be the priority of the rule that R_c continues to nextPriority = priority of rule following R_c
      remove R_c -> A_c from the ruleList while True:
         nextGotoPriority = priority of rule following
                            R_i, or i+1 if R_i is the last rule
         remove R_i -> A_i from the ruleList DECOMPOSE(R_i, R_c) = <IR(i, c), R_i\IR(i, c)> if IR(i, c) is not empty:
            insert IR(i, c) -> A(i, c) at priority nextPriority
            nextPriority = priority of rule following R_nextPriority for all rules in Ri\IR(i, c):
            insert rule -> A_i at a priority between
                           i and nextGotoPriority if IR(i, c) == R_c: # containment criterion
            break i = nextGotoPriority
```

FIG. 8 original traffic policy, 900

```
R0 → [A0] {0}
R1 → [A1, GOTO R2] {1,2,3,5}
R2 → [A2] {2,5,7}
R3 → [A3] {3,5, 6,8}
<match-all> → [ ] {0,1,2,3,4,5,6,7,8}
```

FIG. 9A flattened rules list, 902

```
R0 → A0 {0}

// Intersection Rule
IR(1, 2) → [A(1, 2)] {2, 5}
IR(1, 3) → [A(1, 3)] {3, 5}
IR(1, match-all) → [A1] ] {1,2,3,5}

// Difference Rules
R2 \ IR(1, 2) → [A2] {7} - R2
R3 \ IR(1, 3) → [A3] {8} - R3
<match-all> → [ ] {0,..,8}
```

FIG. 9B

```
R0 → [A0] {0}
R1 → [A1, GOTO R3] {1,2,3,5,9}
R2 → [A2] {2,5,7}
R3 → [A3] {3,5, 6,8}
R4 → [A4] {9, 10}
<match-all> → [ ] {0,1,2,3,4,5,6,7,8,9,10}
``` original traffic policy, 1000

// Start of rules skipped by the continue
R2 → [A2] {2,5,7}

// Start of difference rules
R3 \ IR(1, 3) → [A3] {6, 8}
R4 \ IR(1, 4) → [A4] {10}

<match-all> → [ ] {0,..,10}
``` flattened rules list, 1002

FIG. 10B reference to first rule in traffic policy 1204

```
traffic-policy policy1
    match rule-A ipv4
        source prefix 1.1.1.1/32
        actions
            count acc-A
            goto rule-C
    match rule-B ipv4
        protocol tcp source port 1
        actions
            count acc-B
            goto rule-X
    match rule-C ipv4
        protocol tcp destination port 2
        actions
            count acc-C
    match rule-X ipv4
        source prefix 5.5.5.5/32
        actions
            count acc-A
    match rule-Y ipv4
        destination port 100
        actions
            drop
``` appended rules

FIG. 12B

GOTO ACTION IN NETWORK TRAFFIC POLICIES

BACKGROUND

A network traffic policy is used to identify packets (ingress or egress) for processing. The traffic policy is an ordered list of policy rules, each of which is associated with a set of actions. Each rule is expressed as a combination of match criteria classifying packets (ingress or egress). The rules are processed and eventually compiled into a list of packet filters that can be used in a packet processor. Generally, the list of packet filters are ordered in the same order as the list of source rules, where the first rule in the list is deemed to have highest priority and the last rule has lowest priority. The packet processor matches the list of packet filters against a packet in prioritized, first-hit fashion. In other words, actions associated with the highest priority packet filter that matches the packet are applied to the packet.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 8 shows an algorithm for compiling a traffic policy in accordance with the present disclosure.

FIGS. 9A and 9B show an illustrative example of processing a traffic policy in accordance with FIG. 8.

FIGS. 10A and 10B show another illustrative example of processing a traffic policy in accordance with FIG. 8.

FIGS. 12A and 12B illustrate an alternative form of the GOTO action.

DETAILED DESCRIPTION

Figure 1:
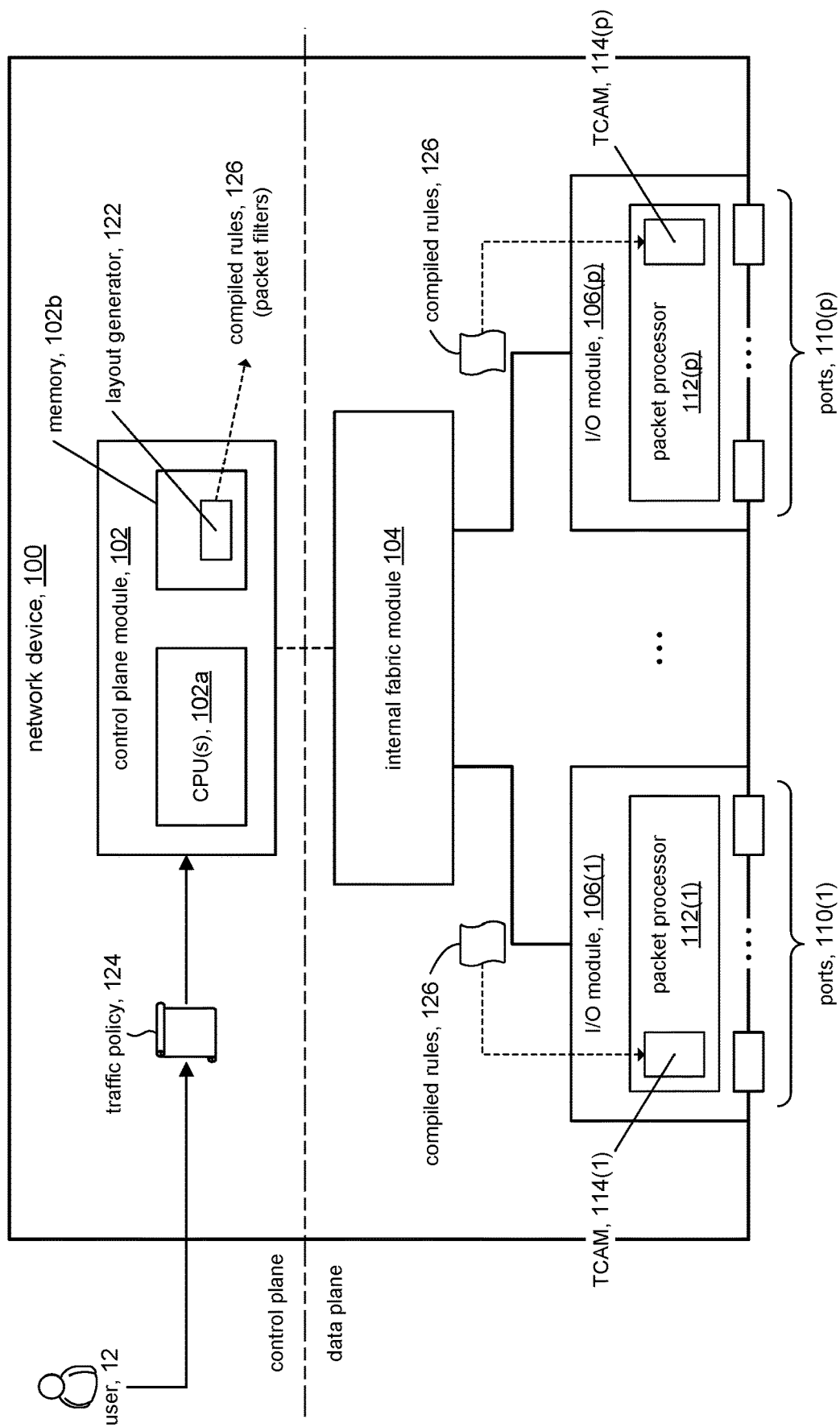
FIG. 1 is a block diagram of a network device in accordance with the present disclosure.

The present disclosure describes GOTO action functionality for policy classification rules in a traffic policy. A GOTO action is an action like any other action that can be associated with a policy rule. The GOTO action specifies another rule in the traffic policy, thus providing a form of rule branching in the policy. The GOTO action can appear in more than one rule.

The GOTO action has the following meaning (effect, execution semantics) in the traffic policy: When a rule having a GOTO action is matched (hits), the actions associated with that rule are applied to the packet and the GOTO action says to continue classification of the packet with the rule specified in the GOTO action.

An aspect of the present disclosure includes extending a human-readable specification language for specifying policy classification rules in a traffic policy to include the GOTO action. A language used to specify the policy rules in a traffic policy, for example, can be extended to include the following syntax:

GOTO<rule_ID>, where rule_ID specifies a non-adjacent rule in the policy that is lower priority than the rule that contains the GOTO action. Stated differently, rule_ID appears lower in the ordered list of rules than does the rule that contains the GOTO action. It will be appreciated that rule_ID can specify a lower priority adjacent rule as well.

Another aspect of the present disclosure includes translating the set of policy rules (source rules) in a traffic policy to produce a corresponding set of compiled rules (packet filters) that preserve the GOTO semantics and priority order of the source rules. While GOTO actions used in the source rules express branching in human-readable form, the compiled rules express the same branching semantics in a linear fashion in order to accommodate the linear processing nature of a packet processor.

The present disclosure improves the functioning of a conventional packet classifier by providing additional classification capability in the packet classifier via the GOTO action. The GOTO action specifies limited branching among the rules in a traffic policy, which allows a user to specify a policy where a packet may be processed by more than one rule. The present disclosure provides for translation of those rules to a linear representation so they can be processed by a conventional packet processor. The present disclosure provides this additional capability without having to replace existing packet processing circuitry, thus avoiding costly hardware upgrades while at the same time gaining benefits made possible by the present disclosure.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows an example of a network device 100 in accordance with some embodiments of the present disclosure. In some embodiments, for example, network device 100 can be a switch or a router. Functionally, network device 100 can be described in terms of control plane functions and data plane functions, although the control plane and data plane may not exist physically. Control plane functionality is known. Briefly, the control plane determines how packets should be forwarded. The control plane provides the functions and processes that determine which path to use to send a packet or a frame. Functions include populating a routing table, drawing network topology, generating a forwarding table and the like.

In some embodiments, network device 100 can include control plane module 102, internal fabric module 104, and I/O modules 106(1)-106(p). Control plane module 102 can include one or more CPUs 102a for managing and controlling operations of network device 100 in accordance with the present disclosure. Each CPU 102a can be a general purpose processor (e.g., Intel® x86, AMD® x86, ARM® processor, etc.) that operates under the control of software stored in memory 102b, such as dynamic random access memory (DRAM), within which to execute software to provide various functionality comprising the control plane module.

Control plane module 102 can include layout generator 122 configured to compile traffic policy 124 in accordance with the present disclosure. In some embodiments, layout generator 122 can be a software module that executes in the control plane. Additional details of layout generator 122 are discussed below. Briefly, layout generator 122 can convert traffic policy 124 to produce compiled rules (packet filters) 126, which can then be downloaded to and processed in the data plane.

Internal fabric module 104 and I/O modules 106(1)-106(p) collectively represent the data plane of network device 100 (also referred to as the data layer, forwarding plane, etc.). The data plane represents a high speed data path for packet flow through the network device. Packets that pass through the network device are processed in the data plane, as opposed to control packets that are directed to the network device.

Internal fabric module 104 represents interconnection between the various other modules of network device 100. Each I/O module 106(1)-106(p) can include one or more input/output ports 110(1)-110(p) that are used by network device 100 to send and receive network packets. Each I/O module 106(1)-106(p) can also include respective packet processor 112(1)-112(p). Each packet processor 112(1)-112(p) can comprise a forwarding hardware (e.g., application specific integrated circuit (ASIC), field programmable array (FPGA), digital processing unit, content-addressable memory, and the like) configured to make wire speed decisions on how to handle incoming (ingress) and outgoing (egress) packets. In some embodiments, the forwarding hardware in each packet processor can be configured as a series of stages called a pipeline, allowing for concurrent processing of several packets at a time along different stages down the pipeline.

In some embodiments, each packet processor 112(1)-112(p) can include a respective ternary content-addressable memories (TCAMs) 114(1)-114(p) to store compiled rules 126. TCAMs are known. Briefly, a TCAM contains a list of <key, value> pairs. The list is "prioritized" in that a <key, value> pair that occurs earlier in the list is deemed to have higher priority than a <key, value> pair that occurs later in the list. The key field in a <key, value> pair can specify "don't care" values (e.g., '*') to enable multiple matches. For example:

key="001*0001"

will match on input keys "00100001" and "00110001".

When a key is input to the TCAM, the TCAM performs a lookup in its memory to see if the input key is stored in any of the stored <key, value> pairs. If the input key matches multiple <key, value> pairs, the TCAM can output the highest priority <key, value> pair among the multiple matches. TCAMs can be configured to perform the lookup operation in a single pass through its memory in order to achieve high throughput for lookup operations in a network device.

The <key, value> pairs stored in TCAMs 114(1)-114(p) can serve to classify and process packets (ingress packets and egress packets) that flow through the network device. In the context of network devices, compiled rules 126 in a TCAM comprise a list of <key, value> pairs. Each <key, value> pair can be referred to as a "packet filter." It is noted that the terms compiled rules and packet filters can and are used interchangeably.

Figure 2:
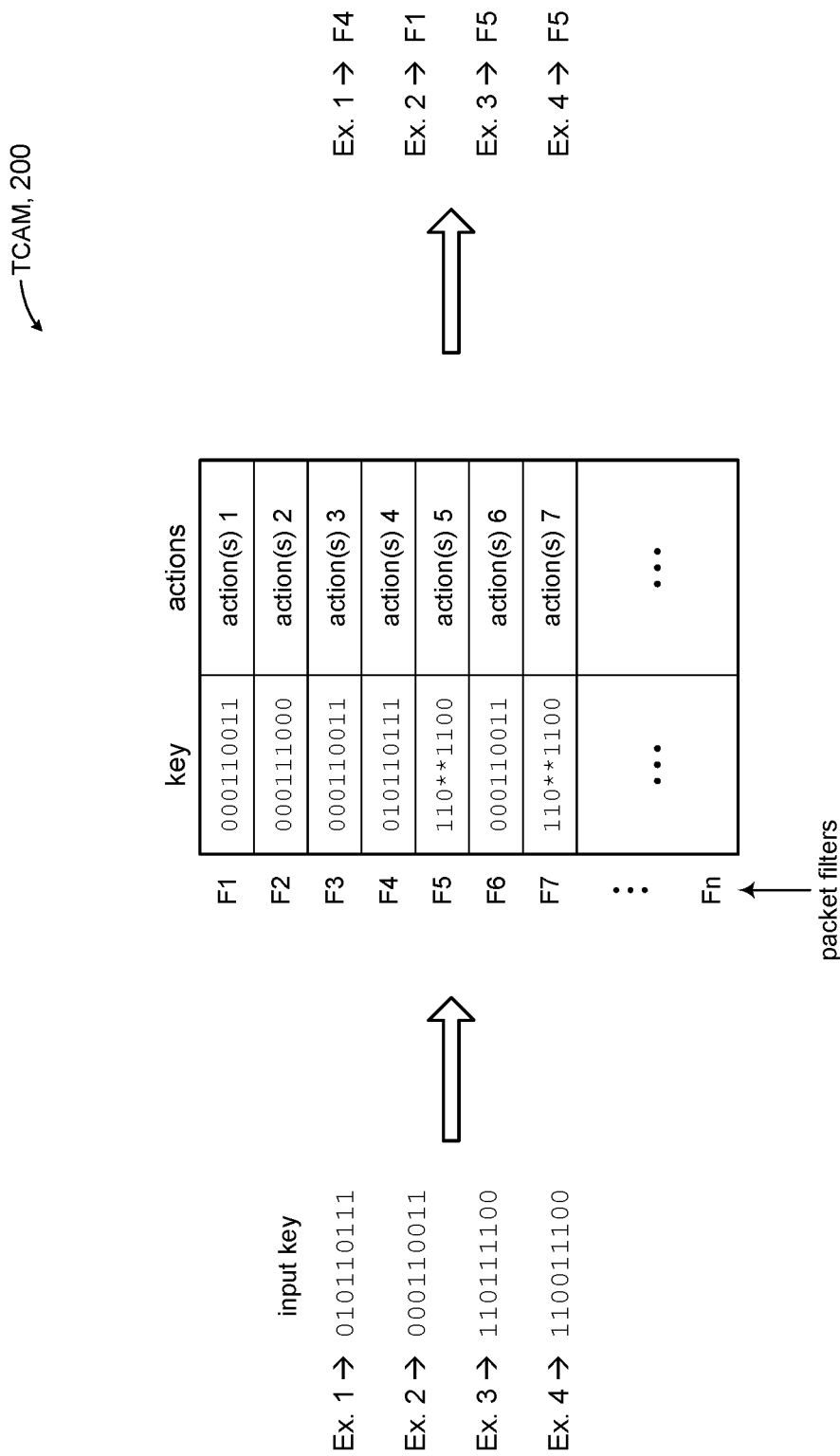
FIG. 2 shows a TCAM in accordance with the present disclosure.

Referring to FIG. 2, the prioritized lookup described above is illustrated with TCAM 200. The TCAM stores a list of packet filters F1 to Fn. As noted above, the rules are "prioritized" in that packet filter Fi is deemed to be higher in priority than packet filter Fj (i<j) appearing further down in the list. For example, F1 is higher priority than F2, which is higher priority than F3 and so on. Each packet filter comprises a key field and a value (actions) field. The TCAM performs a lookup by receiving an input key and searching on the key field.

Example 1 is a lookup with a key ('010110111') that occurs in one filter in TCAM 200, namely F4. Accordingly, the lookup will output packet filter F4.

Example 2 is a lookup with a key ('000110011') that occurs in multiple filters in TCAM 200, namely F1, F3, and F6. Accordingly, TCAM 200 will output F1 because F1 is the highest priority matching packet filter. If F1 is subsequently removed from the TCAM (e.g., the filter ages out), then a subsequent lookup using input key '000110011' would produce F3 because F3 would now be the highest priority matching filter.

Example 3 is a lookup with a key ('110111100') that is matched by filters F5 and F7 by virtue of the presence of don't care symbols in the key fields of F5 and F7. The TCAM would output packet filter F5.

Example 4 is a lookup with a key ('110011100') that is also matched by filters F5 and F7 by virtue of the presence of don't care symbols in the key fields of F5 and F7. The TCAM again would output filter F5.

Referring back to FIG. 1 for a moment, packet filters can be specified by user 12 (e.g., a network administrator) in a textual human-readable format referred to as a traffic policy. A traffic policy classifies or otherwise identifies packets to perform actions associated with the identified packets. Traffic policy 124 can be compiled or otherwise processed in accordance with the present disclosure to create corresponding compiled rules (packet filters) 126. The compiled rules can then be downloaded to packet processors 112(1)-112(p).

Figure 3:
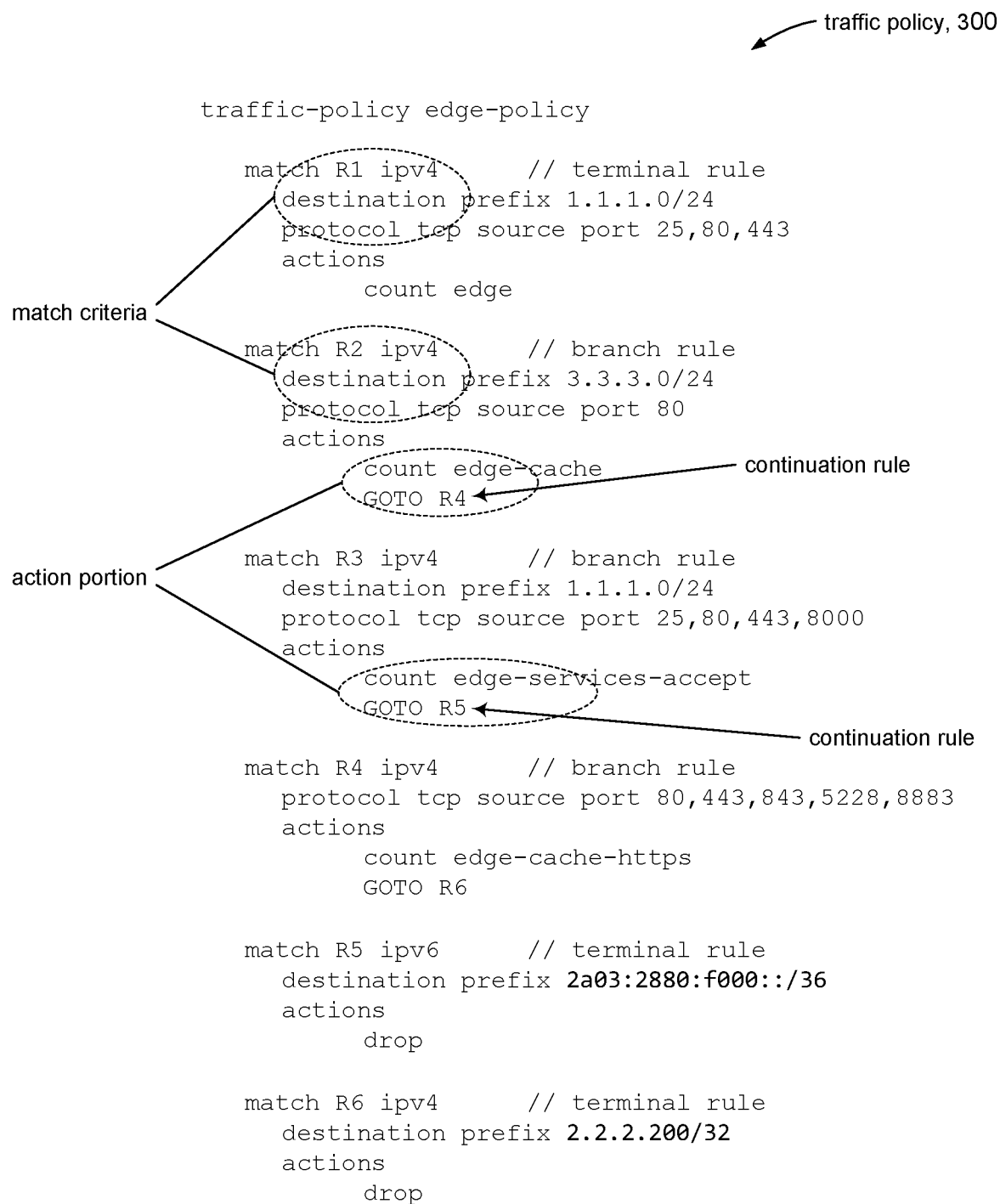
FIG. 3 shows a traffic policy in accordance with the present disclosure.

FIG. 3 shows an illustrative example of a traffic policy in accordance with the present disclosure. The syntax used to express the policy rules comprising traffic policy 300 is illustrative and used for discussion purposes to point out aspects of a traffic policy in accordance with the present disclosure. It will be appreciated that the specific syntax used to express a traffic policy may vary from one embodiment of the present disclosure to another.

The illustrative traffic policy shown in FIG. 3 comprises six policy rules R1 to R6. Policy rules are generally defined and managed by a human user and so are expressed with alphanumeric characters, whereas the packet filters are represented in binary ('0' and '1') because they are stored in memory (e.g., TCAM) and processed by packet processing hardware. The difference between policy rules and packet filters is analogous to the difference between computer source code and executable binary code.

Policy rules are known. Briefly, a policy rule comprises two components: a match criteria component and an actions component. The match criteria can specify data fields in a packet, including the packet headers and the payload. The match criteria can include combinations of data such as source and destination Internet protocol (IP) addresses, source and destination media access control (MAC) addresses, protocol type, port numbers and so on. The actions component includes actions that are in connection with a packet, either directly (e.g., drop the packet, redirect the packet, rewrite portions of the packet, and so on) or indirectly (e.g., increment counters, log messages, and so on).

FIG. 3 shows that a policy rule, in accordance with the present disclosure, can be a "terminal" rule (policy rules R1, R5, and R6) or a "branch" rule (policy rules R2, R3, R4). A branch rule includes a branch action in the action component of the rule. In some embodiments, for example, the branch action can be expressed using a GOTO token and a corresponding label; the label specifies another policy rule in the traffic policy, which can be referred to herein as the "continuation rule." For example, the action component of rule R2 includes a GOTO action that specifies branching to rule R4 as the continuation rule; likewise rule R3 includes a GOTO action to rule branch to (continuation) rule R5. In some embodiments, continuation rules are lower priority than the branch rule in which they are specified.

The logical execution order for classifying packets in accordance with the policy rules in a traffic policy includes executing rules in order of priority, from highest priority to lowest priority. As mentioned above, priority is established by the order in which the rules are listed in the traffic policy; the first rule in the traffic policy is the highest priority rule, the last rule in the traffic policy is the lowest priority rule. Where the rules include both terminal rules and branch rules, the logical execution order is further determined according to the following semantics for terminal rules and branch rules:

Policy rules are prioritized in that the first rule in the traffic policy (e.g., R1) is deemed to have highest priority; subsequent rules in the list have lower priority than earlier rules in the list. The last rule in the traffic policy (e.g., R6) is deemed to have lowest priority. Logically, the traffic policy classifies a packet by matching each rule against the contents of the packet, in sequential order, starting with the first rule in the list. The rule in the traffic policy that matches the packet is said to be "hit."

If the packet hits on a terminal rule, the action(s) associated with the terminal rule will be performed and packet classification terminates.

If the packet hits on a branch rule, the action(s) associated with the branch rule can be delayed. Packet classification continues; the packet is compared against the continuation rule specified in the GOTO action of the branch rule. Four outcomes are possible:

The continuation rule: (1) is another branch rule and (2) matches the packet.

For this outcome, non-branching action(s) associated with the continuation rule are delayed along with any previously delayed actions, and the classification process continues with the continuation rule specified in the GOTO action of the branch rule.

The continuation rule: (1) is a terminal rule (not another branch rule) and (2) matches the packet.

For this outcome, both non-branching action(s) in the continuation rule and any previously delayed actions are performed and packet classification terminates.

The continuation rule: (1) is another branch rule and (2) does not match the packet.

For this outcome, actions in the continuation rule are not processed and the GOTO action is not taken. The classification process continues from the next lower priority rule, namely the rule right after the continuation rule, if it exists. Any previously delayed actions are delayed.

The continuation rule: (1) is a terminal rule (not another branch rule) and (2) does not match the packet.

For this outcome, any previously delayed actions are processed. Actions associated with the terminal continuation rule are not processed and packet classification terminates.

Some examples will now be described to illustrate the above-described classification of a packet according to the semantics of terminal and branch rules in traffic policy 300.

Example 1—Hit on Rule R1

Consider the simple case of rule R1. Policy rule R1 matches IPv4 packets that have a destination IP address in the range specified by the prefix 1.1.1.0/24 and a source port set to 25, 80, or 443. Accordingly, rule R1 will match a packet having:

destination IP (DIP)=1.1.1.128 and source port=80.

Because rule R1 is a terminal rule, the rule is applied in connection with the packet (e.g., incrementing a counter called EDGE) and packet classifying with traffic policy 300 terminates. It will be appreciated, however, that the packet may be subject to classification by other traffic policies further down the packet processing pipeline.

Example 2—Hit on Rule R3 (Single Branch)

Policy rule R3 matches IPv4 packets that have a destination IP address covered by the prefix 1.1.1.0/24 and a source port set to 25, 80, 443, or 8000. Accordingly, a packet having:

DIP=1.1.1.64 and source port=8000 will be matched by rule R3. Because rule R3 is a branch rule, the non-branching actions in R3, namely incrementing the EDGE-SERVICES-ACCEPT counter, will be delayed and packet classification continues. The packet will be compared to the continuation rule specified in the GOTO action, namely policy rule R5. There are two outcomes of the comparison with R5 to consider:

Outcome 1, where rule R5 matches the packet. Because R5 is a terminal rule, all previously delayed actions (in this example increment counter EDGE-SERVICES-ACCEPT) would be performed and the action associated with R5, in this case DROP the packet, would be performed. Further, because R5 is a terminal rule, packet classification with traffic policy 300 would terminate and the packet would proceed down the pipeline for further processing.

Outcome 2, where R5 does not match the packet. The "drop" action in R5 is not performed. The previously delayed action(s), in this example increment counter EDGE-SERVICES-ACCEPT, are delayed, and processing continues with attempting to match the rule following R5, namely R6. Because R6 is the lowest priority rule, packet classification with traffic policy 300 would terminate after processing R6, and the packet would proceed down the pipeline for further processing.

Example 3—Hit on Rule R2 (Chained Branch Rules)

Policy rule R2 matches IPv4 packets that have a destination IP address in the range 3.3.3.0/24 and a source port of 80. Accordingly, R2 will match a packet having:

DIP=3.3.3.32 and source port=80.

Because R2 is a branch rule, the increment action on the EDGE-CACHE counter will be delayed, and packet classification continues. The packet will be compared to the continuation rule specified in the GOTO action, namely policy rule R4. There are two outcomes from comparing the packet to R4 to consider:

Outcome 1, where R4 matches the packet. Because R4 is another branch rule, non-branching actions associated with R4, namely increment EDGE-CACHE-HTTPS, will be delayed. At this point, the list of delayed actions would include:
increment EDGE-CACHE
increment EDGE-CACHE-HTTPS.

Packet classification continues, and the packet would be compared to the continuation rule specified in the GOTO action of R4, namely policy rule R6 (described below).

Outcome 2, where R4 does not match the packet. The action in R4 is not performed. Moreover, the branch in R4 is not taken. Processing continues with the next rule, namely, R5. If R5 matches the packet, both the actions of R5 and the list of delayed actions, namely increment EDGE-CACHE, would be performed; packet classification with traffic policy 300 would terminate and the packet would proceed down the pipeline for further processing. Otherwise, processing continues with the next rule, namely, R6.

There are two outcomes from comparing the packet to R6 to consider:

Outcome 1, where R6 matches the packet. Because R6 is a terminal rule, all previously delayed action(s) would be performed. In addition, the action associated with R6 would be performed. Because R6 is a terminal rule, packet classification with traffic policy 300 would terminate and the packet would proceed down the pipeline for further processing.

Outcome 2, where R6 does not match the packet. Because R6 is a terminal rule, all previously delayed action(s) would be performed. However, because R6 does not match the packet, the action(s) associated with R6 would not be performed. Further, because R6 is a terminal rule, packet classification with traffic policy 300 would terminate and the packet would proceed down the pipeline for further processing.

The foregoing examples describe the execution flow (execution order) in connection with terminal policy rules and branch policy rules. As explained above, the policy rules in a traffic policy can be compiled to produce a list of packet filters (e.g., compiled rules 126) that can then be downloaded and programmed into a packet processor. A TCAM performs a single lookup for a packet to output a single packet filter and as such does not support being able to branch from one filter to another filter. When a traffic policy is compiled in accordance with the present disclosure, the resulting list of packet filters nonetheless preserve the branch semantics (behavior) of any branch rules in the traffic policy.

Figure 4A:
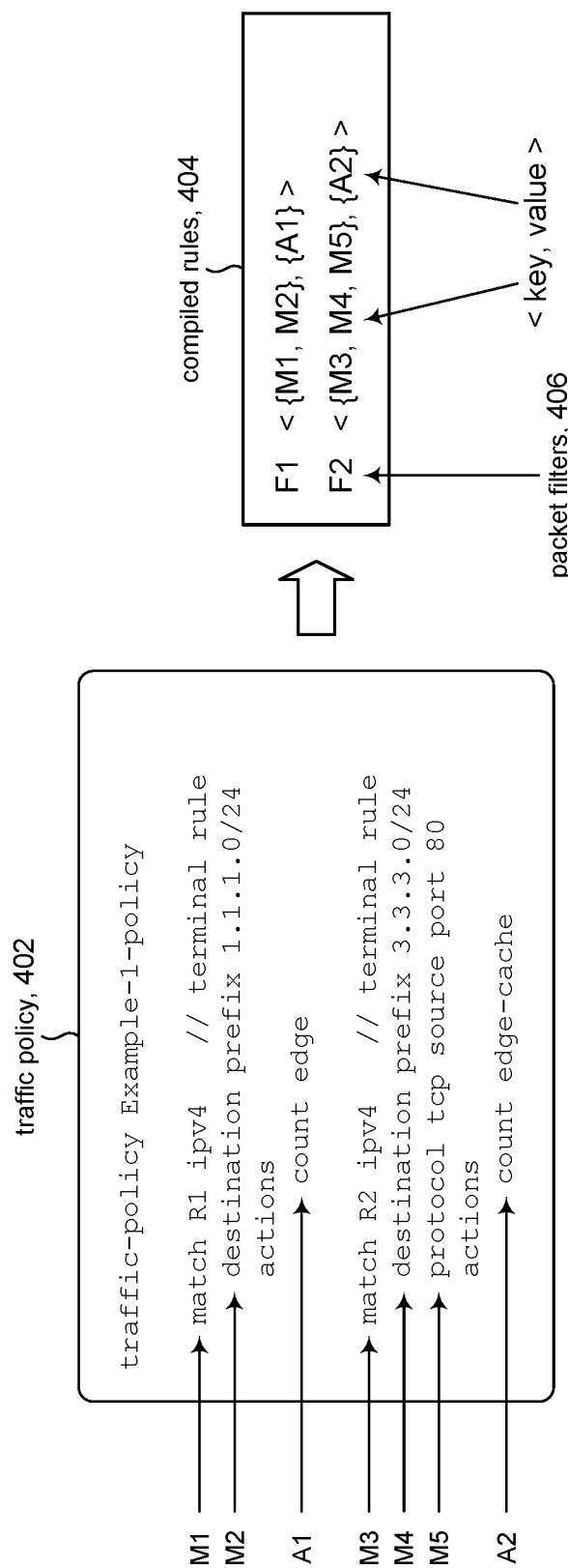
FIGS. 4A, 4B, 4C show examples of traffic policies and corresponding compiled rules in accordance with the present disclosure.
Figure 4B:
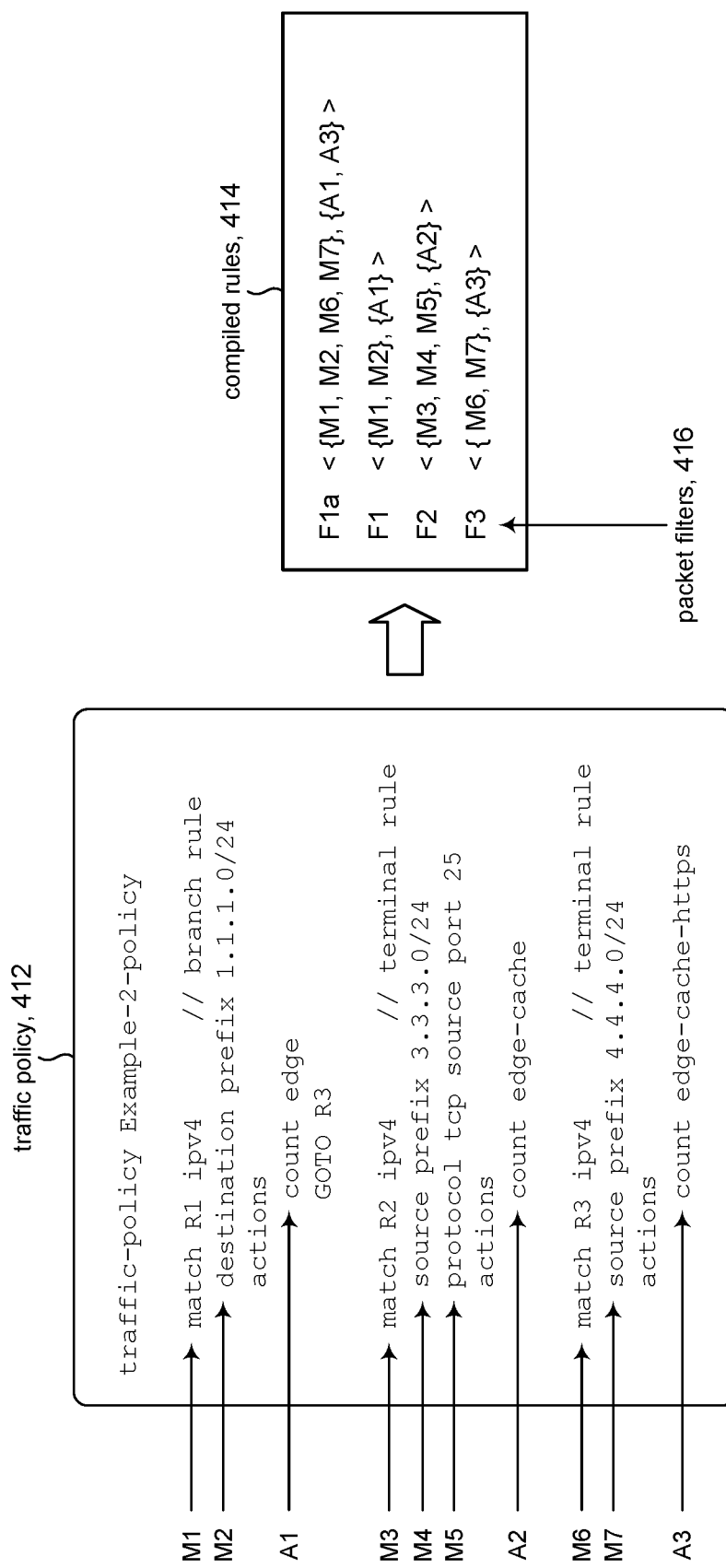
Figure 4C:
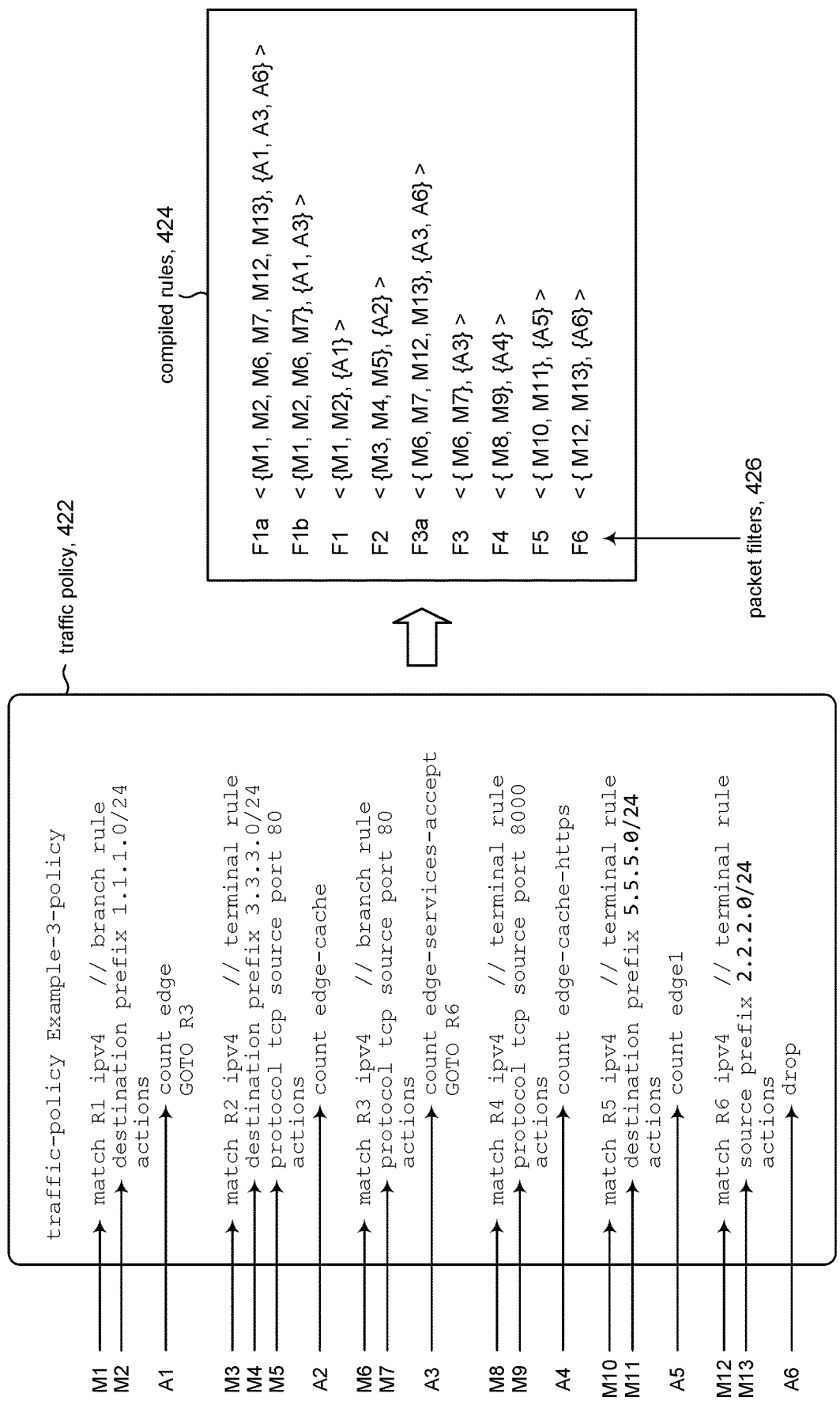

FIGS. 4A to 4C illustrate examples of traffic policies and corresponding packet filters. Traffic policy 402 in FIG. 4A, for example, comprises two terminal policy rules R1, R2. Compiled rules 404 is a representation of the list of packet filters (<key, value> pairs) 406 generated from traffic policy 402 that can be stored in a given TCAM. Each packet filter in compiled rules 404 can be a <key, value> pair comprising a set of one or more match criteria (key) and a set of one or more actions (value). For example, policy rule R1 matches IPv4 packets having a destination IP address in the block of addresses specified by 1.1.1.0/24. The key component in the corresponding packet filter F1 comprises a set of match criteria M1, M2, where M1 represents the IPv4 match criterion and M2 represents the 1.1.1.0/24 match criterion in a data format suitable for the given TCAM. The value component (action set) of packet filter F1 is a set containing one action A1 which represents the action specified in policy rule R1, namely "count edge."

Likewise, policy rule R2 matches packets according to the following match criteria:

packet is IPv4 (M3) AND
destination IP is in the range 3.3.3.0/24 (M4) AND
source port is 80 (M5).

The corresponding <key, value> pair of packet filter F2 comprises:

key={M3, M4, M5}
value={A2}

FIG. 4B shows an example of a traffic policy that includes a branch policy rule. Policy rule R1 in traffic policy 412, for example, includes the branch action "GOTO R3." Compiled rules 414 comprise corresponding packet filters 416 generated in accordance with the present disclosure. For example, policy rules R1, R2, R3 correspond to packet filters F1, F2, F3. The GOTO action in rule R1 does not represent an action that is performed in connection with a packet, but rather specifies another rule to match against a packet. Recall from above, however, that in some embodiments TCAMs are configured to perform a lookup operation in a single pass through their memory (e.g., for high throughput), and as such are not configured for an additional pass to process the GOTO action. Accordingly, while the set of actions in packet filter F1, represent the actions of rule R1 (action A, "count edge"), filter F1 excludes the branch action that corresponds to "GOTO R3" in rule R1.

In accordance with the present disclosure, compiled rules 414 includes an additional packet filter F1a that represents execution of the GOTO action without having to refer to another packet filter. The <key, value> pair comprising filter F1a and the position of filter F1a in the list of packet filters are determined in accordance with the present disclosure so as to preserve the branch semantics of the GOTO action without requiring an additional pass in the TCAM. The following description will bear this out.

Consider first classification of the following packets using traffic policy 412:

Packet 1—IPv4, source IP=5.5.5.12; destination IP=1.1.1.10
Packet 2—IPv4, source IP=4.4.4.32; destination IP=1.1.1.128
Packet 3—IPv4, source IP=4.4.4.64; destination IP=2.2.2.138

Packet 1—R1 will match Packet 1 and so processing will continue with R3 by way of the "GOTO R3" action. R3 will not match Packet 1; action A1 will be applied in connection with Packet 1, and processing of traffic policy 412 terminates.

Packet 2—R1 will match Packet 2 and so processing will continue with R3 by way of the "GOTO R3" action. R3 will match Packet 2; action A1 will be applied in connection with Packet 2 followed by action A3, and processing of traffic policy 412 terminates.

Packet 3—R1 will not match Packet 3, nor will R2. R3 will match Packet 3; action A3 will be applied in connection with Packet 3, and processing of traffic policy 412 terminates.

Consider now the operation of packet filters 414 with respect to Packets 1, 2, and 3, keeping in mind that a single pass is made through the TCAM and the TCAM will output a single filter:

Packet 1—F1a, F1, and F3 will match Packet 1. However, F1a will hit because it has the highest priority among F1a, F1, and F3. Accordingly, the TCAM will output packet filter F1a and actions A1 and A3 will be applied.

Packet 2—Only F1 will match, and so the TCAM will output packet filter F1 and action A1 will be applied.

Packet 3—Only F3 will match, and so the TCAM will output packet filter F3 and action A3 will be applied.

It can be seen from the above discussion that although packet filters 414 do not contain branch actions nor specify other packet filters, nonetheless can represent the branch behavior in traffic policy 412. In particular, the branch action semantics of policy rule R1 is represented by the packet filters by virtue of the addition of packet filter F1a and its placement in the list of packet filters.

FIG. 4C shows an example of chained branch rules in a traffic policy. Policy rules R1 and R3 in traffic policy 422, for example, are "chained" in that one branch rule (R3) follows another branch rule (R1). Compiled rules 424 comprise the packet filters 426 that represent the policy rules in traffic policy 422, including the semantics of the chained branch rules in the traffic policy. Consider, for example, processing the following packets in accordance with traffic policy 422:

Packet 1—IPv4, src IP=2.2.2.32, dst IP=1.1.1.10, next protocol=TCP, source port=80

Packet 2—IPv4, src IP=4.4.4.28, dst IP=1.1.1.25, next protocol=TCP, source port=80

Packet 3—IPv4, src IP=2.2.2.28, dst IP=6.6.6.25, next protocol=TCP, source port=80

Packet 4—IPv4, src IP=4.4.4.28, dst IP=6.6.6.25, next protocol=TCP, source port=80

Packet 5—IPv4, src IP=*, dst IP=1.1.1.30, next protocol=TCP, source port=8000

Packet 1 will match policy rule R1, then continue to and match R3, and then continue to and match R6. Accordingly, actions A1, A3, and A6 will be applied.

Packet 2 will match policy rule R1, then continue to and match R3, and then continue to but NOT match R6. Accordingly, actions A1 and A3 will be applied.

Packet 3 will match policy rule R3 and then continue to, and match, R6. Accordingly, actions A3 and A6 will be applied.

Packet 4 will match policy rule R3 and then continue to, but NOT match, R6. Accordingly, action A3 will be applied.

Packet 5 will match policy rules R1 and then continue to R3, but will not match R3 and processing to continue with the next lower priority rule, namely R4. The '*' in the source IP indicates a wildcard.

Consider now the operation of packet filters 424 on Packets 1, 2, 3, and 4, keeping in mind that a single pass is made through the TCAM and the TCAM will output a single filter:

Packet 1—F1a, F1b, F1, F3a, F3, and F6 will match Packet 1. However, F1a will hit because it has the highest priority among F1a, F1b, F1, F3a, F3, and F6. Accordingly, the TCAM will output packet filter F1a and actions A1, A3, and A6 will be applied.

Packet 2—F1b, F1, F3a and F3 will match Packet 2. However, F1b will hit because it has the highest priority among F1b, F1, F3a and F3. Accordingly, the TCAM will output packet filter F1b and actions A1 and A3 will be applied.

Packet 3—F3a, F3, and F6 will match Packet 3. However, F3a will hit because it has the highest priority among F3a, F3, and F6. Accordingly, the TCAM will output packet filter F3a and actions A3 and A6 will be applied.

Packet 4—Only F3 will match, and so the TCAM will output packet filter F3 and action A3 will be applied.

Figure 5:
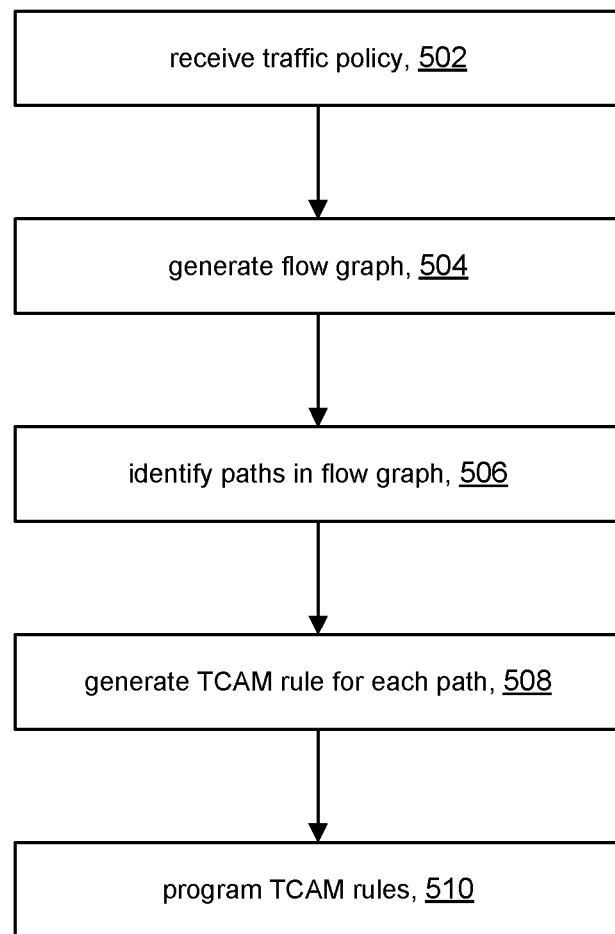
FIG. 5 shows a flow of operations for compiling a traffic policy in accordance with the present disclosure.
Figures 6, 7:
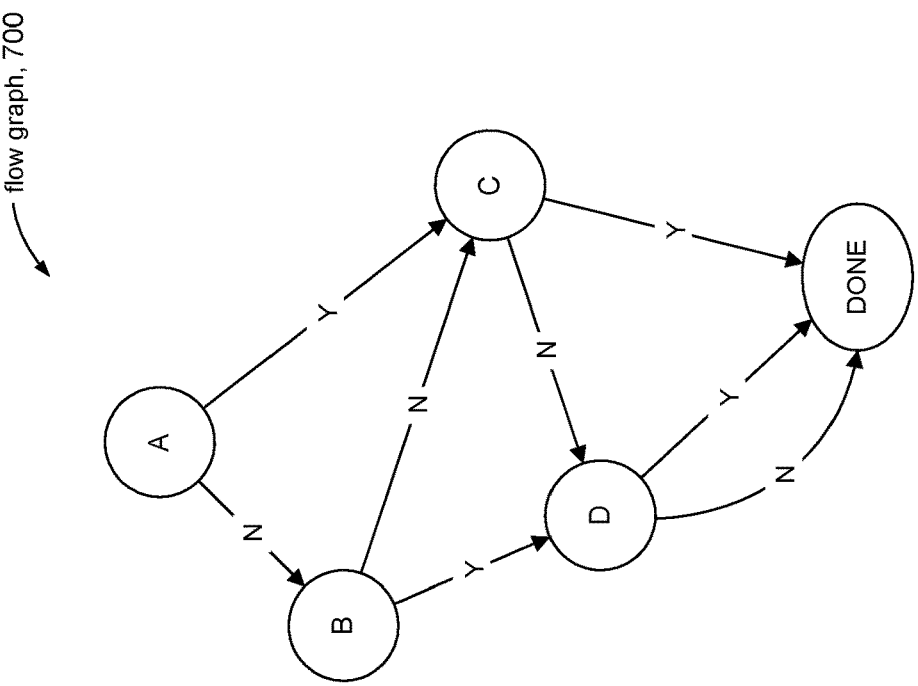
FIG. 6 shows an illustrative example of a traffic policy to explain FIG. 5.
FIG. 7 shows a flow graph based on the traffic policy shown in FIG. 6.

Referring to FIGS. 5, 6, and 7, the discussion will now turn to a high-level description of processing in a network device (e.g., 100, FIG. 1) for generating packet filters from a traffic policy in accordance with some embodiments of the present disclosure. FIGS. 6 and 7 illustrate the operations using a simple traffic policy. Traffic policy 600 in FIG. 6 includes branch rules where the semantics of a branch rule allows for multiple rules that match a packet to be applied in connection with the packet. In some embodiments, the network device can include one or more digital processing units, which when operated, can cause the network device to perform processing in accordance with FIG. 5. Digital processing units can include general CPUs in the control plane that operate by way of executing computer program code stored on a non-volatile computer readable storage medium (e.g., read-only memory); for example, CPU 102 (FIG. 1) in the control plane can be a general CPU. The flow of operations performed by the network device is not necessarily limited to the order of operations shown.

Operation 502 The network device can receive a traffic policy. In some embodiments, for example, the network device can be configured with a user interface to allow a user to create a new traffic policy or manage an existing traffic policy. In other embodiments, the network device can communicate with a central controller to receive a traffic policy from the central controller. The received traffic policy can be stored locally in the network device (e.g., solid state drive, SSD) and processed by the network device. In accordance with the present disclosure, the traffic policy may include one or more branch rules.

Operation 504 The network device can scan the policy rules in the traffic policy to generate a flow graph. Referring to FIGS. 6 and 7 for an illustrative example, traffic policy 600 shown in FIG. 6 consists of a list of four policy rules A, B, C, D. Rules A and B are branch rules. In accordance with some embodiments, flow graph 700 in FIG. 7 can be generated from traffic policy 600 as follows:

Each policy rule in the traffic policy has a corresponding node in the flow graph. A 'Y' branch and a 'N' branch connect the node to another node. The Y branch indicates the policy rule matches an input packet to be processed according to the traffic policy. As noted above, the input packet can be an ingress packet received by the network device or an egress packet to be transmitted by the network device. The N branch indicates a non-match with the input packet, so processing continues with the node that corresponds to the next policy rule in the traffic policy.

All rule nodes lead to a DONE node, which represents termination of the traffic policy.

Terminal policy rule. The Y branch of a node that corresponds to a terminal rule leads directly to the DONE node to indicate that the traffic policy terminates with respect to the input packet when a terminal policy matches a packet; no further rules in that traffic policy are matched. The N branch of the node connects to a node that corresponds to the next policy rule. See, for example, policy rule C in traffic policy 600 and corresponding node C in flow graph 700; if an input packet does not match rule C, then the next policy (rule D) is compared. Action(s) associated with a terminal policy rule are not represented in the flow graph, but can be inferred; if the rule is matched then the action(s) are applied in connection with the packet and if the rule is not matched then the action(s) are not applied.

Branch policy rule. The Y branch of a node that corresponds to a branch rule connects that node to a node that corresponds to the continuation rule (FIG. 3) specified in the GOTO action. See, for example, policy rule A in traffic policy 600 and corresponding node A in flow graph 700. The N branch (branch rule is not matched) connects to a node in the flow graph that corresponds to the next policy rule. Action(s) associated with a branch policy rule are not represented in the flow graph, but can be inferred. In accordance with some embodiments, for example, if the rule is matched then the action(s) are accumulated and applied when a terminal rule is reached; if the rule is not matched then the action(s) are not accumulated.

Operation 506 Continuing with FIG. 5, the network device can identify paths in the flow graph. In some embodiments, flow paths can be identified using a traversal strategy that is loosely based on depth first traversal as follows:

Find all paths from the root node (A) to the leaf node (DONE).

Paths are traversed, where traversal priority is given to Y edges over N edges. Referring again to flow graph 700 (FIG. 7), the first path that is traversed is A to C to DONE because we traverse from A (root node) to DONE (leaf node) along the Y edges first. The next path is A to C to D to DONE: traverse A to C on the Y edge, then C to D on the N edge, then D to DONE on the Y edge. Continuing with this sequence leads to the following list of prioritized paths:
1. A-y→C-y→DONE
2. A-y→C-n→D-y→DONE
3. A-y→C-n→D-n→DONE
4. A-n→B-y→DONE
5. A-n→B-y→D-n→DONE
6. A-n→B-n→C-y→DONE
7. A-n→B-n→C-n→D-y→DONE
8. A-n→B-n→C-n→D-n→DONE In each path, remove (skip) from the path nodes that have an outgoing N edge. Referring to path #2 in the list above, for example, the C node is removed because the C node has an outgoing N edge. Likewise, in path #3, the C and D nodes are removed because each has an outgoing N edge. Continuing with this strategy of removing outgoing N edges leads to the final list of paths below. Path #8 (above) is removed from the list because it become empty after removing all nodes in the path that have outgoing N edges, namely nodes A, B, C, D:
1. A→C→DONE
2. A→D→DONE
3. A→DONE
4. B→D→DONE
5. B→DONE
6. C→DONE
7. D→DONE Operation 508 The network device can generate a packet filter based on each path in the flow graph. Summarizing up to this point, in accordance with some embodiments, a traffic policy (e.g., 600) can be scanned and analyzed to produce a corresponding flow graph (e.g., 700). Each node in the flow graph corresponds to a policy rule in the traffic policy. The flow graph represents the execution order through the traffic policy when packets are processed, from the first (highest priority) rule to the last (lowest priority) rule. The nodes in the flow graph are connected by Y and N edges, which represent when a match occurs (Y) or does not occur (N) with a given input packet. The above final list of paths represents a layout of packet filters that preserves the execution order of the traffic rules. In some embodiments, a packet filter can be generated from these paths according to the following formation guidelines:

Single-node Path (excluding the DONE node)—The key component of the packet filter (FIG. 4A) comprises the match criteria of the policy rule that corresponds to the one node. The value component of the packet filter comprises the action(s) of that policy rule. Consider path #3, for example, which has a single node A. The packet filter generated from path #3 can be represented by the following <key, value> pair:
<{SRC=="1.1.1.1"}, {COUNT ACC-A}>

As another example, single-node path #5 would produce;
<{PROT==6 &&SRC_PORT==1}, {COUNT ACC-B}>

Multi-node Path (not counting the DONE node)—The key component of the packet filter comprises an intersection of the respective match conditions of the corresponding nodes, and the value component comprises a union of the respective actions of the corresponding nodes. Consider multi-node path #1, for example, comprising nodes A and C:
node A: <{SRC=="1.1.1.1" }, {COUNT ACC-A}>
node C: <{PROT==6 && DST_PORT==2}, {COUNT ACC-C}>

To facilitate an explanation for computing the intersection of the key components, we expand nodes A and C as follows so that there is a one-to-one correspondence between the match criteria:
node A: <{SRC=="1.1.1.1" && PROT==ANY && DST_PORT==ANY}, {COUNT ACC-A}>
node C: <{src==ANY && PROT==6 && DST_PORT==2}, {COUNT ACC-C}>

The 'ANY' terms represent match-all wildcards. For example, node A does not specify a next protocol (PROT) or a destination port (DST_PORT), so this is equivalent to expressing node A as matching on a packet having source IP==1.1.1.1 and "any" next protocol (PROT==ANY) and "any" destination port (DST_PORT==ANY). Accordingly, The intersection of the match criteria of A and C can be computed by taking the intersection of the corresponding match criteria:
SRC=="1.1.1.1"∩SRC==ANY→SRC=="1.1.1.1"
PROT==ANY∩PROT==6→PROT==6
DST_PORT==2 ∩DST_PORT==2→DST_PORT==2 to yield:
{(SRC=="1.1.1.1" && PROT==ANY) && (PROT==6 && DST_PORT==2)},

The union of the actions of A and C can be expressed as:
{COUNT ACC-A, COUNT ACC-C}.

The packet filter for path #1 can be represented by the following <key, value> pair:

<{SRC=="1.1.1.1" && PROT==6 && DST_PORT==2}, {COUNT ACC-A, COUNT ACC-C}>

Based on the foregoing guidelines, the following packet filters can be generated from paths 1-7 above:

1. <{SRC=="1.1.1.1" && PROT==6 && DST_PORT==2}, {COUNT ACC-A, COUNT ACC-C}>
2. <{SRC=="1.1.1.1" && DST=="2.2.2.2"}, {COUNT ACC-A, COUNT ACC-D}>
3. <{SRC=="1.1.1.1"}, {COUNT ACC-A}>
4. <{PROT==6 && SRC_PORT==1 && DST=="2.2.2.2"}, {COUNT ACC-B, COUNT ACC-D}>
5. <{PROT==6 && SRC_PORT==1}, {COUNT ACC-B}>
6. <{PROT==6 && DST_PORT==2}, {COUNT ACC-C}>
7. <{DST=="2.2.2.2"}, {COUNT ACC-D}>

The above packet filters represent the semantics (execution order) of the terminal and branch rules in traffic policy 600.

Operation 510 The network device can install the packet filters in each of its packet processors (e.g., 112, FIG. 1). In some embodiments, the packet filters can be programmed in the TCAMs 114 of respective packet processors 112. Processing of a traffic policy in accordance with the present disclosure can be deemed complete.

FIG. 8 is a procedure expressed in pseudo code that sets forth an algorithm for compiling a traffic policy that contains branch policy rules, in accordance with another embodiment of the present disclosure. The procedure "GotoActionResolver" takes as input a "rulelist" which is the traffic policy (containing branch policy rules) to be compiled. Whereas the processing shown in FIG. 5 scans the list of policy rules starting from the top, the GotoActionResolver procedure in FIG. 8 processes a traffic policy starting from the lowest priority branch policy rule in the list and working up. Basically, for each branch rule, we define:

$R_c$—the current lowest priority branch policy rule being resolved $C=\{R_i, \ldots, R_n\}$—set of rules (terminal and branch) to be matched on after the GOTO action, where i is the priority of the branch rule containing the GOTO action. Because $R_c$ is the current lowest priority branch policy rule being resolved, it is guaranteed that the set C does not contain any branch rule, as they would have been resolved by a previous iteration of the decomposition algorithm.

$N=\{R_{skipped-1}, \ldots, R_{skipped-N}\}$—set of rules between $R_c$ and $R_i$ which are skipped if a packet hits the branch rule.

For each rule in C, we DECOMPOSE the rule into two sets of rules (intersection rules and difference rules) as follows:

$C_{int}=\{IR(R_k, R_c)$ for k in range([i, n])\}$—set of intersection rules, sorted by priority i to n, $C_{diff}=\{R_k \backslash IR(R_k, R_c)$ for k in range([i, n])\}$—set of difference rules, sorted by priority i to n.

An intersection rule $IR(R_a, R_b)$ for rules $R_a, R_b$ is a rule defined according to the following formal definition:

Rules can be viewed as being composed of d fields. Rules can be geometrically represented as a prioritized collection of hyper-rectangles in a d-dimensional Euclidean space. A packet is a point in this space. Let R[i] represent the $i^{th}$ field in R (i ranges from 1 to d). $IR(R_a, R_b)$ is defined as $R_a \cap R_b = \{Ra[i] \cap Rb[i], \forall i\}$, where, if $Ra[i] \cap Rb[i]$ is a null set for some i, then $IR(R_a, R_b)$ is deemed empty.

Stated less formally, the intersection rule $IR(R_a, R_b)$ for rules $R_a, R_b$, is a rule comprising the minimum set of match criteria from $R_a$ and $R_b$ that matches a packet that would also be matched by $R_a$ and by $R_b$. For example, suppose we have:

policy rule $R_a$: source IP 10.0.0.0/8 && source port 100
policy rule $R_b$: source IP 10.0.0.0/24 && source port 100-110, then $IR(R_a, R_b)$ is:

source IP 10.0.0.0/24 && source port 100.

The source IP address 10.0.0.0/24 is common to both rules; the IP address is explicit in $R_b$ and is included in the range of IP addresses in $R_a$. The source port 100, likewise, is common to both rules: it is explicit in $R_a$ and is included in the range of source ports in $R_b$.

A difference rule $R_a \backslash IR(R_a, R_b)$ for rules $R_a, R_b$ is a rule comprising match criteria that includes all match criteria in $R_a$ that are not in $IR(R_a, R_b)$. As the name of the rule suggests, the difference rule can be viewed as a rule that results from "subtracting" out $IR(R_a, R_b)$. Using the example policy rules $R_a, R_b$ above, $R_a \backslash IR(R_a, R_b)$ specifies:

source IPs in 10.0.0.0/8 (excluding source IPs in 10.0.0.0/24) && source port 100.

A containment criterion is met when the union of IR(m, c) for all m visited so far is equal to Rc. Essentially, this means the continue-rule space has been fully covered and we can stop decomposing lower priority rules. For simplicity, we can fall through and continue processing until we hit a lower priority rule which fully covers Rc. Note that the last rule is a catch-all rule and will always cover Rc.

FIGS. 9A and 9B illustrate an example of compiling a traffic policy in accordance with the algorithm of FIG. 8, where original traffic policy 900 in FIG. 9A includes a branch rule R1 that does not skip any rules. The continuation rule specified by the GOTO action immediately follows the branch rule. The figures use the following notation, where the set of actions is represented by brackets ([ . . . ]) and the set of match criteria is represented by braces ({ . . . }). FIG. 9B shows the decomposition of R2 and R3 with respect to R1 which produces the intersection and different rules. The intersection rules represent the execution order from branch rule R1 when R1 matches a packet. The difference rules represent the execution order from branch rule R1 when R1 does not match a packet. The result is flattened rules list 902 which represents the execution order of the original traffic policy, but without the GOTO action. The rules comprising the flattened-rules list can be compiled into corresponding packet filters, which can then be programmed into a TCAM.

FIGS. 10A and 10B illustrate an example of compiling a traffic policy in accordance with the algorithm of FIG. 8, where original traffic policy 1000 in FIG. 10A includes a branch rule R1 that skips a rule. The continuation rule specified by the GOTO action is separated from the branch rule by at least one terminal rule. FIG. 10B shows that the decomposition of R3 and R4 with respect to R1 produces intersection rules that represent the execution order from branch rule R1 when R1 matches a packet. The difference rules represent the execution order from branch rule R1 when R1 does not match a packet. Flattened rules list 1002 represents the execution order of the original traffic policy, but without the GOTO action. The flattened rules list can be compiled to produce a set of corresponding packet filters, which can then be programmed into a TCAM.

Figure 11A:
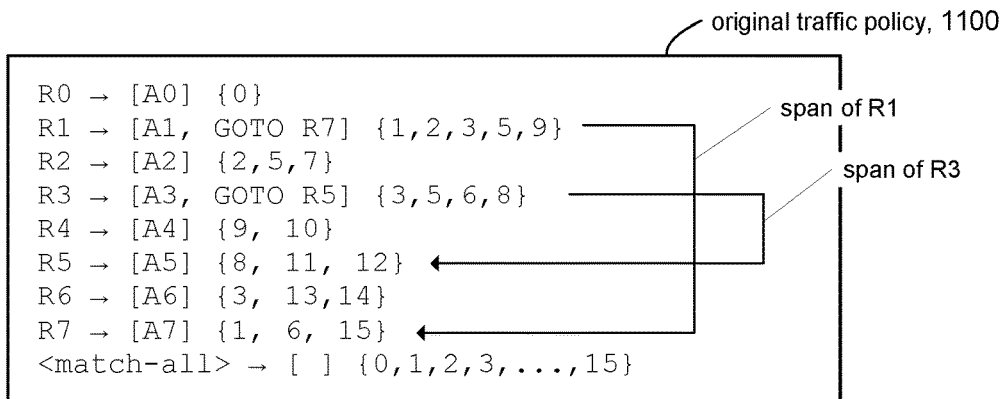
FIGS. 11A, 11B, and 11C show yet another illustrative example of processing a traffic policy in accordance with FIG. 8.
Figure 11B:
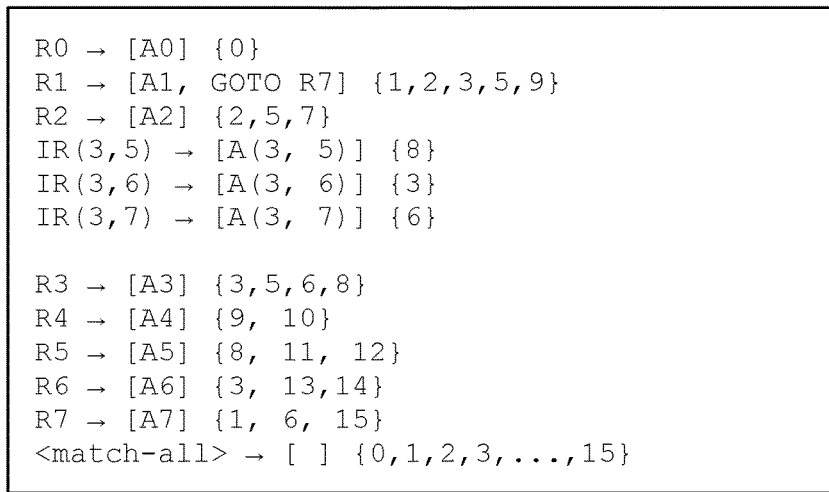
Figure 11C:
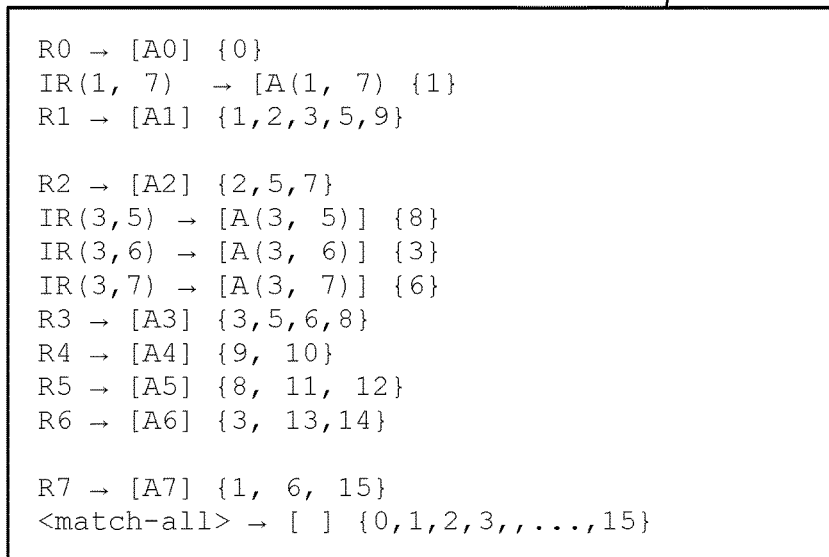

FIGS. 11A, 11B, 11C illustrate an example of compiling a traffic policy in accordance with the algorithm of FIG. 8, where original traffic policy 1100 in FIG. 11A includes branch rules R1, R3 with continue destinations that overlap. The span of the GOTO action of R1 overlaps the span of the GOTO action of R3. FIG. 11B shows a first iteration through the WHILE loop in FIG. 8 to resolve the lowest priority rule with a GOTO action, namely R3. FIG. 11C shows the results of the second iteration through the while loop to resolve the next higher priority rule with a GOTO action, namely R1. The result is flattened rules list 1104 which represents the execution order of the original traffic policy, but without the GOTO actions. The flattened rules list can be compiled to produce a set of corresponding packet filters, which can then be programmed into a TCAM.

Figure 12A:
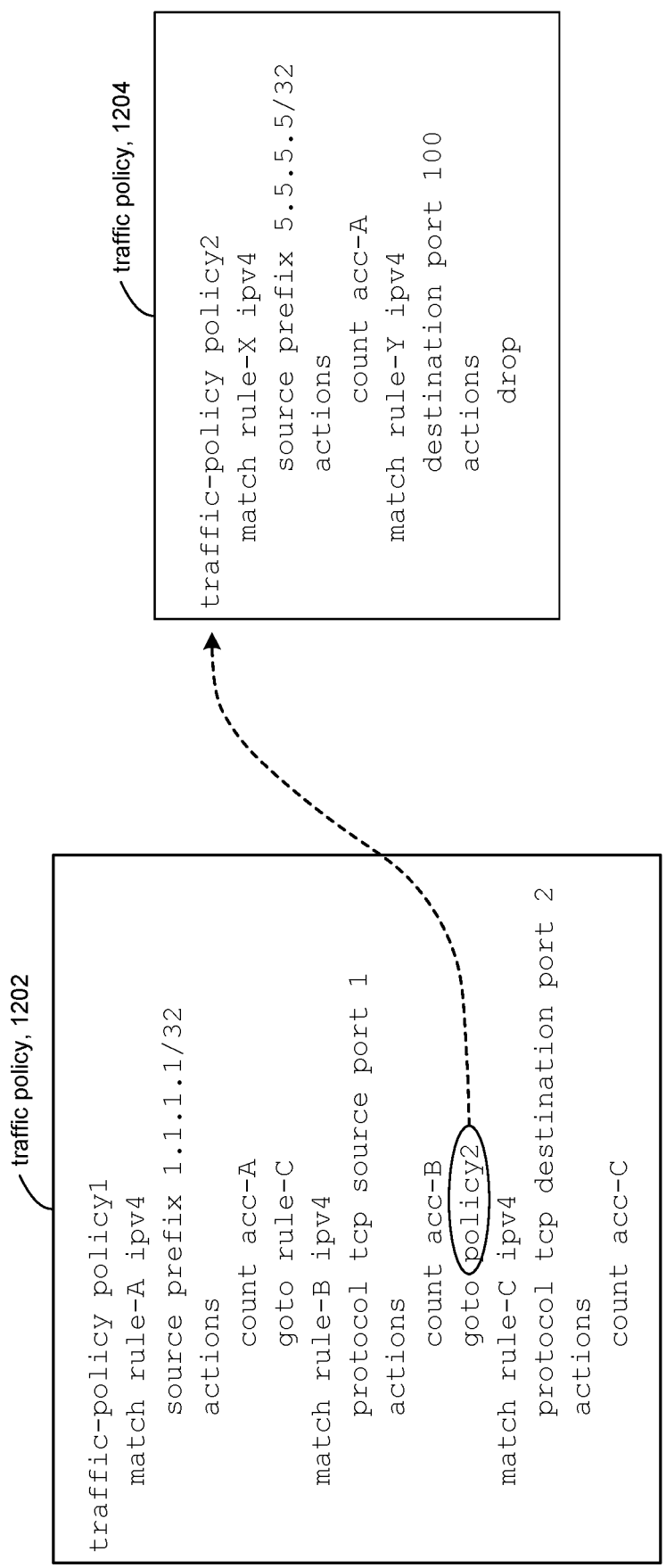

Referring to FIGS. 12A and 12B, in some embodiments, the GOTO action of a branch rule in a given traffic policy can reference a completely separate traffic policy instead of another rule within the given traffic policy. Traffic policy 1202, for example, includes branch rule RULE-B having a GOTO action that references traffic policy 1204. When traffic policy 1202 is compiled, the rules in the referenced traffic policy 1204 can be logically appended to the bottom of traffic policy 1202 as shown in the logical representation in FIG. 12B. The traffic policy referenced in the GOTO action is logically replaced with the first rule in the referenced traffic policy.

FURTHER EXAMPLES

In accordance with some embodiments of the present disclosure, a method includes receiving a traffic policy comprising a plurality of policy rules, wherein at least a first policy rule is associated with one or more first actions including a branch action that specifies a second policy rule in the traffic policy, wherein the second policy rule is associated with one or more second actions; generating a plurality of packet filters that represents the plurality of policy rules comprising the traffic policy, wherein the plurality of packet filters includes a first packet filter that represents the first policy rule, a second packet filter that represents the second policy rule, and a third packet filter that represents a combination of the first policy rule and the second policy rule; and storing the plurality of packet filters in a packet processor. The first, second, and third packet filters represent an execution order of the first and second policy rules without referencing other packet filters in the plurality of packet filters.

In some embodiments, a policy rule includes match criteria for matching a packet and one or more actions that are performed in connection with a matched packet, wherein a packet filter that corresponds to the policy rule includes corresponding match criteria and corresponding action(s).

In some embodiments, the third packet filter includes a representation of the first actions and the second actions and excludes the branch action of the first policy rule.

In some embodiments, the second policy rule includes a branch action that specifies a third policy rule in the traffic policy, wherein the plurality of packet filters includes a packet filter that represents of the first actions, the second actions, and actions associated with the third policy rule and excludes the branch actions of the first policy rule and the second policy rule.

In some embodiments, the plurality of policy rules is an ordered list, and the first policy rule appears in the ordered list before the second policy rule.

In some embodiments, the first policy rule and the second policy rule are not adjacent to each other among the plurality of policy rules.

In some embodiments, the method further comprises storing the plurality of packet filters in a content-addressable memory.

In accordance with some embodiments of the present disclosure, a network device includes one or more computer processors; and a computer-readable storage medium comprising instructions for controlling the one or more computer processors to: receive a traffic policy comprising a plurality of policy rules, wherein at least some of the plurality of policy rules include respective branch actions to other rules in the traffic policy; generate a plurality of packet filters that represents the plurality of policy rules comprising the traffic policy, wherein the plurality of packet filters include packet filters that represent execution order semantics of the branch actions of said at least some of the plurality of policy rules; and store the plurality of packet filters in a packet processor.

In some embodiments, the packet filters that represent execution order semantics of the branch actions of said at least some of the plurality of policy rules do not reference other packet filters in the plurality of packet filters.

In some embodiments, the packet filters that represent execution order semantics of the branch actions of said at least some of the plurality of policy rules are ordered in the plurality of packet filters in accordance with the execution order semantics of the branch actions of said at least some of the plurality of policy rules.

In some embodiments, a first policy rule in the traffic policy is associated with a branch action that specifies a second policy rule, wherein the plurality of packet filters includes a first packet filter that represents the first policy rule and a second packet filter that represents a combination of the first policy rule and the second policy rule. In some embodiments, the first packet filter comprises match criteria specified only in the first policy rule, wherein the second packet filter comprises match criteria specified in the first policy rule and in the second policy rule. In some embodiments, the first packet filter comprises actions specified only in the first policy rule, wherein the second packet filter comprises actions specified in the first policy rule and in the second policy rule.

In some embodiments, a first policy rule in the traffic policy is associated with a branch action that specifies a second policy rule, wherein the second policy rule includes a branch action that specifies a third policy rule in the traffic policy, wherein the plurality of packet filters includes a first packet filter that represents the first policy rule, a second packet filter that represents a combination of the first policy rule and the second policy rule, and a third packet filter that represents a combination of the first policy rule, the second policy rule, and the third policy rule.

In accordance with some embodiments of the present disclosure, a network device includes one or more computer processors; and a computer-readable storage medium comprising instructions that control the one or more computer processors to: receive a traffic policy comprising a plurality of policy rules, including a first policy rule that is associated with a branch action that specifies a second policy rule, generate a first packet filter that represents the first policy rule and does not refer to another packet filter; generate a second packet filter that represents a combination of the first policy rule and the second policy rule and does not refer to another packet filter; and store the first and second packet filters in a packet processor.

In some embodiments, the computer-readable storage medium further comprises instructions that control the one or more computer processors to generate a list of packet filters that represents the plurality of policy rules comprising the traffic policy, wherein the second packet filter appears in the list of packet filters before the first packet filter, wherein packet filters comprising the list of packet filters are matched in order according to their occurrence in the list.

In some embodiments, the first packet filter represents actions specified only in the first policy rule, excluding the branch action, wherein the second packet filter represents the actions specified in the first policy rule, excluding the branch action, and actions specified in the second policy rule.

In some embodiments, the first policy rule and the second policy rule are not adjacent to each other in the traffic policy.

In some embodiments, the second policy rule includes a branch action to a third policy rule, wherein the computer-readable storage medium further comprises instructions that control the one or more computer processors to generate a third packet filter that represents a combination of the of the first policy rule, the second policy rule, and the third policy rule and does not refer to another packet filter. In some embodiments, the third packet filter represents actions specified in the first policy rule, actions specified in the second policy rule, and actions specified in the third policy rule and excludes the branch actions in the first and second policy rules.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed by a network device, the method comprising:
the network device receiving a traffic policy, the traffic policy comprising a plurality of policy rules, including:
a first policy rule comprising one or more first match criteria and one or more first actions and a branch-type action that specifies a second policy rule; and
the second policy rule comprising one or more second match criteria and one or more second actions,
wherein when a received packet matches the first and second match criteria, the first actions are performed and the second actions are performed by virtue of the branch-type action in the first policy rule,
wherein when a received packet matches only the first match criteria, only the first actions are performed,
wherein when a received packet matches only the second match criteria, the second actions are performed and not the first actions,
the network device generating a plurality of packet filters that preserve action processing behavior of the plurality of policy rules, wherein the plurality of packet filters are absent branch-type actions, the generating including:
generating a first packet filter that represents the first and second policy rules;
generating a second packet filter that represents only the first policy rule; and
generating a third packet filter that represents only the second policy rule; and
the network device storing the plurality of packet filters in a prioritized, first hit hardware device of the network device, wherein the first packet filter is evaluated before the second packet filter, and the second packet filter is evaluated before the third packet filter,
wherein when a received packet matches the first packet filter, the first and second actions are performed,
wherein when a received packet matches the second packet filter, only the first actions are performed,
wherein when a received packet matches the third packet filter, the second actions are performed and not the first actions.

2. The method of claim 1, wherein a policy rule includes match criteria for matching a packet and one or more actions that are performed in connection with a matched packet, wherein a packet filter that corresponds to the policy rule includes corresponding match criteria and corresponding action(s).

3. The method of claim 1, wherein neither the first nor the second actions are performed when a received packet does not match either the first or the second match criteria.

4. The method of claim 1, wherein the second policy rule includes a branch action that specifies a third policy rule in the traffic policy, wherein the plurality of packet filters includes a packet filter that represents of the first actions, the second actions, and actions associated with the third policy rule and excludes the branch actions of the first policy rule and the second policy rule.

5. The method of claim 1, wherein the plurality of policy rules is an ordered list, and the first policy rule appears in the ordered list before the second policy rule.

6. The method of claim 1, wherein the first policy rule and the second policy rule are not adjacent to each other among the plurality of policy rules.

7. The method of claim 1, wherein the prioritized, first hit hardware device is a content-addressable memory.

8. A network device comprising:
one or more computer processors;
a prioritized, first hit hardware device; and
a computer-readable storage device comprising instructions that control the one or more computer processors to:
receive a traffic policy comprising a plurality of policy rules, including:
a first policy rule comprising one or more first match criteria and one or more first actions and a branch-type action that specifies a second policy rule; and
the second policy rule comprising one or more second match criteria and one or more second actions,
wherein when a received packet matches the first and second match criteria, the first actions are performed and the second actions are performed by virtue of the branch-type action in the first policy rule,
wherein when a received packet matches only the first match criteria, only the first actions are performed,
wherein when a received packet matches only the second match criteria, the second actions are performed and not the first actions,
generate a plurality of packet filters that preserve action processing behavior of the plurality of policy rules, wherein the plurality of packet filters are absent branch-type actions, wherein the generate plurality of packet filters include:
a first packet filter that represents the first and second policy rules;
a second packet filter that represents only the first policy rule; and
a third packet filter that represents only the second policy rule; and
store the plurality of packet filters in the prioritized, first hit hardware device, wherein the first packet filter is evaluated before the second packet filter, and the second packet filter is evaluated before the third packet filter, wherein when a received packet matches the first packet filter, the first and second actions are performed, wherein when a received packet matches the second packet filter, only the first actions are performed, wherein when a received packet matches the third packet filter, the second actions are performed and not the first actions.

9. The network device of claim 8, wherein a policy rule includes match criteria for matching a packet and one or more actions that are performed in connection with a matched packet, wherein a packet filter that corresponds to the policy rule includes corresponding match criteria and corresponding action(s).

10. The network device of claim 8, wherein neither the first nor the second actions are performed when a received packet does not match either the first or the second match criteria.

11. The network device of claim 8, wherein the second policy rule includes a branch action that specifies a third policy rule in the traffic policy, wherein the plurality of packet filters includes a packet filter that represents of the first actions, the second actions, and actions associated with the third policy rule and excludes the branch actions of the first policy rule and the second policy rule.

12. The network device of claim 8, wherein the plurality of policy rules is an ordered list, and the first policy rule appears in the ordered list before the second policy rule.

13. The network device of claim 8, wherein the first policy rule and the second policy rule are not adjacent to each other among the plurality of policy rules.

14. The network device of claim 8, wherein the prioritized, first hit hardware device is a content-addressable memory.

15. A non-transitory computer-readable storage device in a network device, the non-transitory computer-readable storage device having stored thereon computer executable instructions, which when executed, cause the network device to:

receive a traffic policy comprising a plurality of policy rules, including:

a first policy rule comprising one or more first match criteria and one or more first actions and a branch-type action that specifies a second policy rule; and the second policy rule comprising one or more second match criteria and one or more second actions, wherein when a received packet matches the first and second match criteria, the first actions are performed and the second actions are performed by virtue of the branch-type action in the first policy rule, wherein when a received packet matches only the first match criteria, only the first actions are performed, wherein when a received packet matches only the second match criteria, the second actions are performed and not the first actions, generate a plurality of packet filters that preserve action processing behavior of the plurality of policy rules, wherein the plurality of packet filters are absent branch-type actions, wherein the generate plurality of packet filters include:

a first packet filter that represents the first and second policy rules;

a second packet filter that represents only the first policy rule; and a third packet filter that represents only the second policy rule; and store the plurality of packet filters in a prioritized, first hit hardware device of the network device, wherein the first packet filter is evaluated before the second packet filter, and the second packet filter is evaluated before the third packet filter, wherein when a received packet matches the first packet filter, the first and second actions are performed, wherein when a received packet matches the second packet filter, only the first actions are performed, wherein when a received packet matches the third packet filter, the second actions are performed and not the first actions.

16. The non-transitory computer-readable storage device of claim 15, wherein neither the first nor the second actions are performed when a received packet does not match either the first or the second match criteria.

17. The non-transitory computer-readable storage device of claim 15, wherein the second policy rule includes a branch action that specifies a third policy rule in the traffic policy, wherein the plurality of packet filters includes a packet filter that represents of the first actions, the second actions, and actions associated with the third policy rule and excludes the branch actions of the first policy rule and the second policy rule.

18. The non-transitory computer-readable storage device of claim 15, wherein the plurality of policy rules is an ordered list, and the first policy rule appears in the ordered list before the second policy rule.

19. The non-transitory computer-readable storage device of claim 15, wherein the first policy rule and the second policy rule are not adjacent to each other among the plurality of policy rules.

20. The non-transitory computer-readable storage device of claim 15, wherein the prioritized, first hit hardware device is a content-addressable memory.

* * * * *